United States Patent
Fukushi et al.

[11] Patent Number: 5,612,972
[45] Date of Patent: Mar. 18, 1997

[54] SPECTRUM SPREAD SIGNAL RECEPTION WITH DIFFERENTIAL DEMODULATION OF SPECTRUM SPREAD DEMODULATED COMPONENTS AT EACH SYNCHRONOUS POINT AND AT A POINT ALWAYS ONE SYMBOL PERIOD LATER

[75] Inventors: Mikio Fukushi; Hideho Tomita, both of Tokyo, Japan

[73] Assignee: NEC Corporation, Japan

[21] Appl. No.: 364,701

[22] Filed: Dec. 28, 1994

[30] Foreign Application Priority Data

Dec. 28, 1993 [JP] Japan .................................. 5-336643

[51] Int. Cl.⁶ .............................. H04K 1/00; H04L 7/00
[52] U.S. Cl. ........................................... 375/206; 375/355
[58] Field of Search ..................................... 375/200, 206, 375/208, 355, 329, 283, 343, 330, 340; 327/164

[56] References Cited

U.S. PATENT DOCUMENTS

| | | | |
|---|---|---|---|
| 4,829,543 | 5/1989 | Borth et al. ............................ | 375/329 |
| 5,018,166 | 5/1991 | Tjahjadi et al. ........................ | 375/355 |
| 5,084,913 | 1/1992 | Kinoston et al. ....................... | 375/208 |
| 5,128,960 | 7/1992 | van Driest et al. .................... | 375/200 |
| 5,131,006 | 7/1992 | Kamerman et al. .................... | 375/355 |
| 5,151,920 | 9/1992 | Haagh et al. .......................... | 375/200 |
| 5,311,544 | 5/1994 | Park et al. ............................. | 375/355 |
| 5,402,450 | 3/1995 | Lennen .................................. | 375/343 |

*Primary Examiner*—Tesfaldet Bocure
*Attorney, Agent, or Firm*—Ostrolenk, Faber, Gerb & Soffen, LLP

[57] ABSTRACT

In a spectrum spread receiver, a tracking unit tracks successive regions covering maximum correlation values, respectively, in spectrum spread demodulated components to produce a timing signal indicative of synchronous points respectively in the regions. Responsive to the timing signal, a differential demodulator unit demodulates the spectrum spread demodulated components at each synchronous point and at a time which is always one symbol period later than this synchronous point. Differential demodulation is carried out in this manner so as to be faithfully inverse relative to differential modulation in a spectrum spread transmitter.

14 Claims, 4 Drawing Sheets

SPECTRUM SPREAD SIGNAL RECEPTION WITH DIFFERENTIAL DEMODULATION OF SPECTRUM SPREAD DEMODULATED COMPONENTS AT EACH SYNCHRONOUS POINT AND AT A POINT ALWAYS ONE SYMBOL PERIOD LATER

BACKGROUND OF THE INVENTION

This invention relates to a spectrum spread ("SS") reception of an SS modulated signal and, more particularly, to an SS receiver and to an SS receiving method.

In the manner which will later be described in greater detail, an SS communication network comprises an SS transmitter and an SS receiver. In the SS transmitter, adjacent symbol data of a transmitter input signal are first differential modulated into differential modulated components of a differential modulated signal. For transmission to such SS receivers as SS modulated components of an SS modulated signal through a propagation path which may be either a radio path or a wired path, the differential modulated components are multiplied by an SS mode representative of a synchronization signal which simulates noise. The SS receiver comprises a receiver unit for receiving the SS modulated signal as SS reception components of an SS reception signal, an SS demodulator unit for individually multiplying the SS code on the reception components to produce SS demodulated components of an SS demodulated signal, and a differential demodulator unit for differentially demodulating the SS demodulated components into differential demodulated components of a differential demodulated signal for use as a receiver output signal which is a reproduction of the transmitter input signal.

The reception components have a common symbol period of length. The SS demodulated components depend on correlation values between the SS code and individual components of the reception signal. The SS code consists of a predetermined number of chips having a common chip period or length which is equal to the symbol period divided by the predetermined number.

Because of SS modulation by the SS code, the SS modulated signal is hardly adversely affected by noise which spreads away during SS demodulation even if superposed on the SS modulated signal in the propagation path. The SS modulated signal furthermore has a high degree of secrecy. SS communication is consequently suitable for application to a mobile communication network and to a local area network (LAN). In fact, an excellent wireless LAN receiver station is disclosed by van Driest and another of the Netherlands, assignors to NCR Corporation, in U.S. Pat. No. 5,128,960.

In the manner which will also be later described in more detail, the differential demodulator unit is operable in a conventional SS receiver in response to a synchronizing section output signal of a synchronizing section to monitor the correlation values to determine synchronous points at time points of maximum correlation values. The synchronizing section output signal indicates successive synchronous points. Responsive to the synchronizing section output signal, the differential demodulator unit uses the SS demodulated components at the synchronous points in dealing with difference calculation.

The SS receiver is operable at a receiver clock frequency which is generated independently of a transmitter clock frequency used in the SS transmitter. The receiver clock frequency indicates the symbol period and the chip period and consequently determines the synchronous points and furthermore the SS demodulated components used in the difference calculation.

The receiver clock frequency is liable to a frequency shift relative to the transmitter clock frequency. If transmitted through the radio propagation path, the SS modulated signal is subject to undesirable influences caused by multipath and/or delay spread. This results in a time shift of the maximum correlation values relative to true synchronous points. As a consequence, the maximum correlation values may appear more than one chip period earlier or later than due synchronous points. The frequency shift gives rise to a deterioration in operation of the SS receiver. If present, the time shift additionally deteriorates precision and correctness of demodulation of the SS modulated signal.

It should be noted in connection with the above that the symbol period is more exactly what the SS modulated components have in common in terms of the transmitter clock frequency. The chip period is similarly what is commonly had by the chips used in the SS transmitter and receiver. Incidentally, the word "symbol" is used in the expression "symbol period" by referring to the symbol data and is different in meaning from the symbol of the data symbol used in van Driest et al.

It is usual as described in van Driest et al to use twice as high as the transmitter clock frequency as the receiver clock frequency. Use of this twice oversampling in the SS receiver is with a view to reducing adverse effects which may otherwise be caused by the frequency and the time shifts. That is, the twice oversampling makes it possible to deal with differential demodulation by merely using the symbol period after initial establishment of the synchronous points. This mere use of the symbol period, however, results in a difficulty in H/W operation and is incapable of coping with the frequency shift.

SUMMARY OF THE INVENTION

It is consequently an object of the present invention to provide a spectrum spread (SS) receiving method of receiving an SS modulated signal with a high demodulation precision.

It is another object of this invention to provide an SS receiving method which is of the type described and which makes it possible to differential demodulate SS demodulated data always at optimum points.

It is still another object of this invention to provide an SS receiving method which is of the type described and in which the differential demodulation is carried out by faithfully inversely dealing with differential modulation carried out in a counterpart SS transmitter.

It is yet another object of this invention to provide an SS receiving method which is of the type described and which can correctly SS demodulate the SS modulated signal even in the presence of a frequency shift of a receiver clock frequency relative to a transmitter clock frequency used in the SS transmitter and even in the existence of adverse effects caused by multipath and/or delay spread when the SS modulated signal is transmitted through a radio propagation path.

It is a further object of this invention to provide an SS receiver for implementing an SS receiving method of the type described.

Other objects of this invention will become clear as the description proceeds.

In accordance with an aspect of this invention, there is provided a spectrum spread receiving method which is for receiving a spectrum spread modulated signal transmitted from a spectrum spread transmitter for differential modulating adjacent symbol data of a transmitter input signal into differential modulated components and for individually multiplying a spectrum spread code and the differential modulated components into spectrum spread modulated components of the spectrum spread modulated signal and which comprises the steps of receiving the spectrum spread modulated signal as reception components having a common symbol period, individually multiplying the spectrum spread code and the reception components into spectrum spread demodulated components, and output demodulating the spectrum spread demodulated components into differential demodulated components of a reproduction of the transmitter input signal, wherein the output demodulating step comprises the steps of (A) tracking successive regions of a greater correlation value in the spectrum spread demodulated components to produce a timing signal indicative of synchronous points in the regions, respectively, and (B) differential demodulating responsive to the timing signal the spectrum spread demodulated components into the differential demodulated components at each of the synchronous points and at a time point which is always one symbol period later than the last-mentioned synchronous points.

In accordance with a different aspect of this invention, there is provided a spectrum spread receiver which is for receiving a spectrum spread modulated signal transmitted from a spectrum spread transmitter for differential modulating adjacent symbol data of a transmitter input signal into differential modulated components and for individually multiplying a spectrum spread code and the differential modulated components into spectrum spread modulated components of the spectrum spread modulated signal and which comprises receiver means for receiving the spectrum spread modulated signal as reception components having a common symbol period, spectrum spread demodulating means for individually multiplying the spectrum spread code and the reception components into spectrum spread demodulated components, and output demodulator means for demodulating the spectrum spread demodulated components into differential demodulated components of a reproduction of the transmitter input signal, wherein the output demodulator means comprises (A) tracking means for tracking regions of a greater correlation value in the spectrum spread demodulated components to produce a timing signal indicative of synchronous points in the regions, respectively, and (B) differential demodulator means responsive to the timing signal for differential demodulating the spectrum spread demodulated components into the differential demodulated components at each of the synchronous points and at a time point which is always one symbol period later than the last-mentioned synchronous point.

Other features and advantages of the present invention will become apparent from the following description of the invention which refers to the accompanying drawings.

Figure 1:
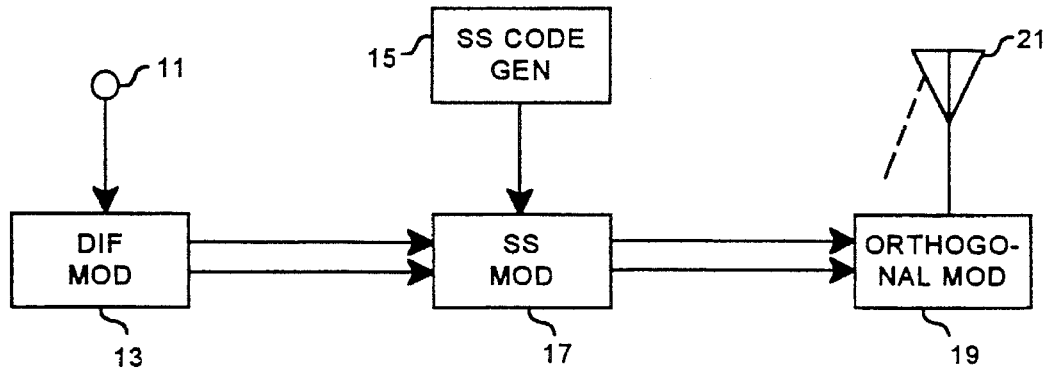
FIG. 1 is a block diagram of a spectrum spread (SS) transmitter for use in an SS communication network in general.
Figure 2:
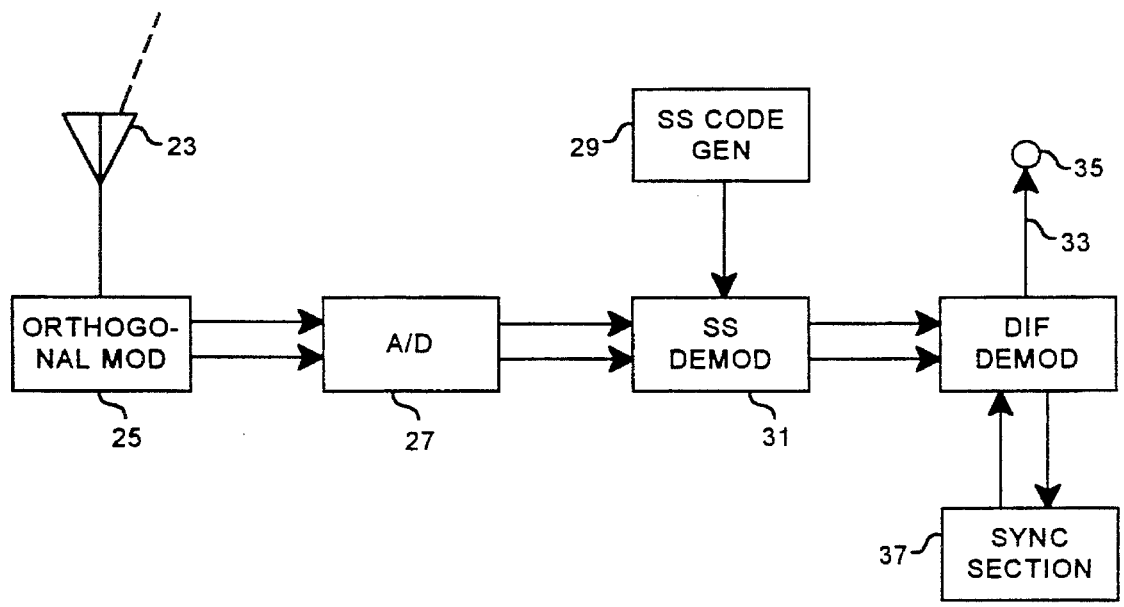
FIG. 2 is a block diagram of a conventional SS receiver for use in the SS communication network which comprises SS transmitters of the type illustrated in FIG. 1.
Figure 3:
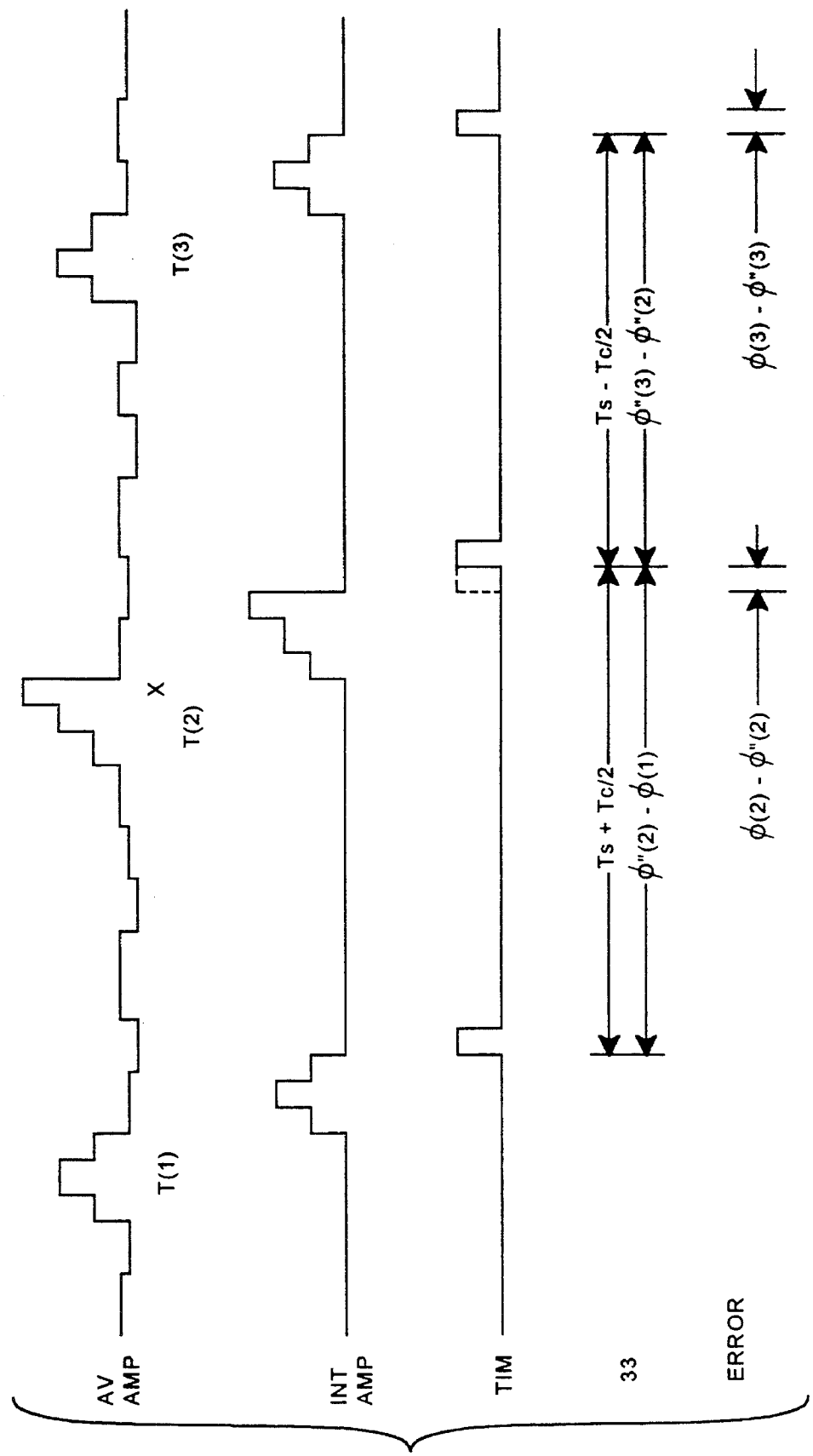
FIG. 3 shows a schematic time chart for use in describing operation of the SS receiver depicted in FIG. 2.

DESCRIPTION OF THE PREFERRED EMBODIMENT:

Referring to FIGS. 1 through 3, a spectrum spread (SS) communication network and operation of a conventional SS receiver will first be described in order to facilitate an understanding of the present invention. Like in the patent to van Driest et al., referred to hereinabove, the SS communication network is a radio SS communication network.

Referring more particularly to FIG. 1, an SS transmitter of the SS communication network has a transmitter input terminal 11 supplied with a transmitter input signal comprising successive symbol data. Supplied from the transmitter input terminal 11 with the transmitter input signal, a differential (DIF) modulator 13 modulates adjacent symbol data into differential modulated inphase (I) and quadrature (Q) components of a differential modulated signal. Such inphase and quadrature components will herein be referred to as orthogonal components or simply as components.

For use in SS modulation, a transmitter SS code generator 15 generates a transmitter SS code which specifies a predetermined number of chips of a common chip period. Connected to the differential modulator 13 and to the SS code generator 15, an SS modulator 17 multiplies the SS code on the differential modulated signal, namely, individually on the differential modulated orthogonal components, to produce SS modulated orthogonal components of an SS modulated signal. Using two carrier signals having a 90° phase difference, an orthogonal modulator 19 two-phase orthogonal modulates the SS modulated signal into an SS modulated transmission signal for feed, after being radio-frequency amplified, to a transmitter antenna 21. The SS modulated orthogonal components and like orthogonal components of the SS modulated transmission signal have a common transmitter symbol period which is equal to the chip period multiplied by the predetermined number.

Turning to FIG. 2, a conventional SS receiver is used in the SS communication network as a counterpart of the SS transmitter illustrated with reference to FIG. 1. The SS receiver is equipped with a receiver antenna 23 for receiving the SS modulated transmission signal as an SS modulated reception signal through a propagation path which is depicted by dashed lines in FIGS. 1 and 2 and is a radio propagation path in the example being illustrated.

Connected to the receiver antenna 23, an orthogonal demodulator 25 two-phase orthogonal demodulates the SS modulated reception signal into reception analog orthogonal components. Connected to the orthogonal demodulator 25, an analog-to-digital converter (A/D) 27 converts the analog reception orthogonal components into digital reception orthogonal components which have in a demodulated reception signal a substantially common receiver symbol period as will presently become clear. The reception orthogonal components of the demodulated reception signal correspond to the SS modulated orthogonal components. The receiver symbol period is consequently substantially equal to the transmitter symbol period and is herein referred to usually simply as a symbol period.

For use in SS demodulation, a receiver SS code generator 29 generates a receiver SS code which is identical in principle with the transmitter SS code and accordingly has the chip period. Connected to the analog-to-digital converter 27 and to the receiver SS code generator 29, an SS demodulator 31 individually multiplies the receiver SS code and the reception orthogonal components of the demodulated reception signal to produce SS demodulated orthogonal components of an SS demodulated signal. In the manner which will be described subsequently, a differential demodulator 33 differentially demodulates the SS demodulated orthogonal components into differential demodulated orthogonal components of a differential demodulated signal for delivery to a receiver output terminal 35 as a receiver output signal which is in theory a reproduction of the transmitter input signal.

Using the SS demodulated orthogonal components delivered to the differential demodulator 33, a synchronizing (SYNC) section 37 monitors correlation values between the receiver SS code and the reception orthogonal components of the demodulated reception signal to determine successive regions of a greater correlation value in the SS demodulated orthogonal components and furthermore successive synchronous points at time instants of maximum correlation values in the regions, respectively. With respect to the differential demodulator 33, the synchronizing section 37 delivers a synchronization signal successively indicative of the synchronous points.

Responsive to the synchronization signal, the differential demodulator 33 differentially demodulates the SS demodulated signal into the differential demodulated signal by using the SS demodulated orthogonal components at the successive synchronous points for difference calculation between a pair of the SS demodulated orthogonal components at each of the synchronous points and a subsequent pair of the SS demodulated orthogonal components at a next one of the synchronous points. The time instants of the maximum correlation values, however, fluctuate depending on a frequency shift between a receiver clock frequency used in the SS receiver and a transmitter clock frequency used in the SS transmitter and on influences of multipath and/or delay spread caused to the SS modulated transmission signal during transmission through the radio propagation path. The frequency shift and the influences furthermore give rise to a difference of the symbol period in the SS receiver from the transmitter symbol period. The frequency shift results additionally in another difference in the chip period of the receiver SS code from that of the transmitter SS code.

Referring to FIG. 2 and FIG. 3 with, it is assumed in the manner described in van Driest et al that the receiver clock frequency is equal to twice the transmitter clock frequency. Measured in terms of the receiver clock frequency, the symbol period is designated by Ts. The chip period is denoted by Tc. The frequency shift and/or external disturbances, such as the influences of multipath and delay spread, are indicated as an anomaly X. Incidentally, the analog-to-digital converter 27 produces in this event two bits of digital reception inphase or quadrature component in each chip period.

In the manner described before in outline, each maximum correlation value determines a due or correct synchronous point unless influenced by an anomaly. Such a due point is in exact correspondence to the time instant used in the differential modulator 13 described in connection with FIG. 1. The anomaly, however, gives rise to a forward or a backward shift of up to a half chip period Tc/2 to the time instant of maximum correlation value. As a consequence, the maximum correlation value indicates in a worst case one of a forwardly and a backwardly shifted point which are more than the half chip period earlier and later than the due point.

For successive determination of the synchronous points, the synchronizing section 37 may use an amplitude signal representative of an average amplitude AvAmp which is used in each correlation value and which the SS demodulated orthogonal components have in each half chip period as an average of an instantaneous amplitude $\sqrt{(I^2+Q^2)}$, where I and Q stand for the SS demodulated inphase and quadrature components. The amplitude signal is exemplified in FIG. 3 along a top or first row labelled by a legend AvAmp.

It is now presumed that a first maximum correlation value appears in the amplitude signal to determine a due first point T(1) as a first one of the synchronous points. Incidentally, forwardly and backwardly shifted first points will be designated by T'(1) and T"(1). A second maximum correlation value is subjected to the backward shift and determines, rather than either a due second point T(2) as a second one of the synchronous points or a forwardly shifted second point T'(2), a backwardly shifted second point T"(2), namely, (T(2)+Tc/2). A third maximum correlation value determines a due third point T(3), rather than forwardly and backwardly shifted third points T'(3) and T"(3), as a third one of the synchronous points.

In the manner which will later be described, the synchronizing section 37 may comprise an amplitude integrator operable during three half-chip periods to integrate during each half chip period into an integrated amplitude IntAmp the instantaneous amplitude above an amplitude threshold value. In this event, the amplitude integrator produces an integrated amplitude signal representative during the three half-chip periods in each symbol period such integrated amplitudes in the manner illustrated in FIG. 3 along a second row with a legend Int Amp.

Fed back with the synchronization signal produced to indicate the synchronous points in response to the integrated amplitude signal, the differential demodulator 33 is put into operation at timings depicted in FIG. 3 along a third row with a legend TIM. A timing is illustrated by dashed lines in correspondence to the due second point.

Put in operation, the differential demodulator 33 calculates arctan(I/Q) as an angular datum $\phi$. Such angular data will be represented by $\phi(1)$, $\phi(2)$, and $\phi(3)$ if the differential demodulator 33 is put in operation at the due first, second, and third points. The angular data will be denoted by $\phi'(1)$, $\phi"(1)$, $\phi'(2)$, $\phi"(2)$, $\phi'(3)$, and $\phi"(3)$ when the differential demodulator 33 is put in operation at the forwardly and the backwardly shifted first, second, and third points.

In the example being illustrated, the differential demodulator 33 calculates a first calculated difference $(\phi"(2)-\phi(1))$ at the backwardly shifted second point which is a first interval (Ts+Tc/2) later than the due first point. At the due third point which is a second interval (Ts−Tc/2) later than the backwardly shifted second point, the differential demodulator 33 calculates a second calculated difference $(\phi(3)-\phi"(2))$. Such intervals and calculated differences are illustrated in FIG. 3 along a fourth or penultimate row with a legend 33 used as the reference numeral of the differential demodulator.

If exactly put in operation at the first through the third data points, the differential demodulator 33 would calculate first and second angular differences $(\phi(2)-\phi(1))$ and $(\phi(3)-\phi(2))$. The anomaly puts in this manner the differential demodulator 33 erroneously in operation to produce the calculated differences with first and second differential demodulation errors ($\phi(2)-\phi''(2)$) and ($\phi''(3)-\phi(3)$) relative to the angular differences as depicted in FIG. 3 along a fifth or bottom row with a legend ERROR.

Figure 4:
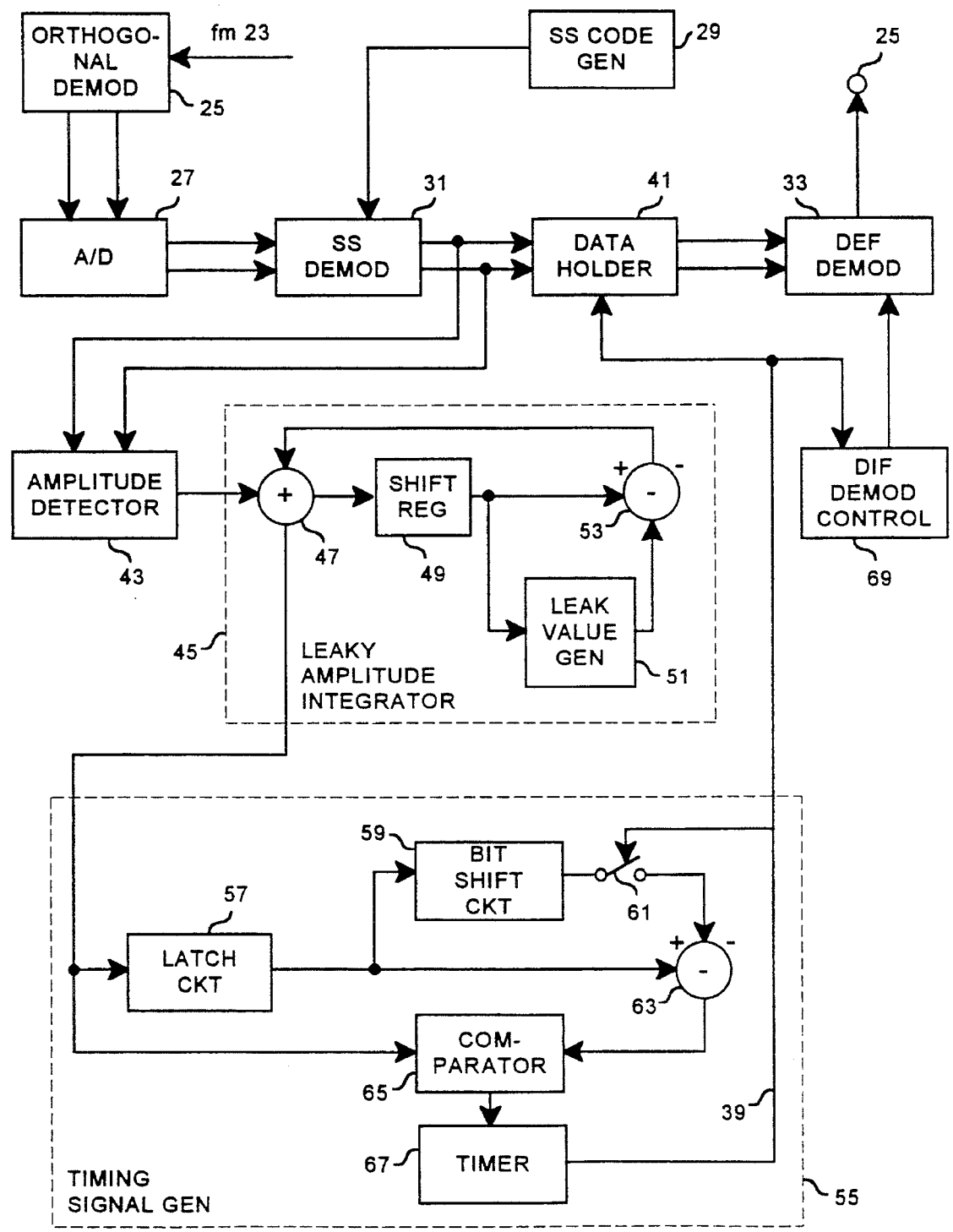
FIG. 4 is a block diagram of an SS receiver according to an embodiment of the instant invention.

Referring to FIG. 4, the description will proceed to an SS receiver according to a preferred embodiment of this invention. Similar parts are designated by like reference numerals and are similarly operable with likewise named signals indicative of likewise named quantities or values. The SS receiver is supplied at the receiver antenna 23 with the SS modulated transmission signal through the radio propagation path from the SS transmitter illustrated with reference to FIG. 1.

Interposed between the SS demodulator 31 and the differential demodulator 33 and supplied through a connection 39 with a timing signal indicative of successive regions for synchronous points, respectively, in the SS demodulated signal with each region made to successively include primary through ternary half chip periods in the manner which will later be described, a data holder 41 holds primary through ternary data of the SS demodulated orthogonal components during the first through the ternary periods. The data holder 41 delivers the primary through the ternary data to the differential demodulator 33 in each symbol period.

Figure 5:
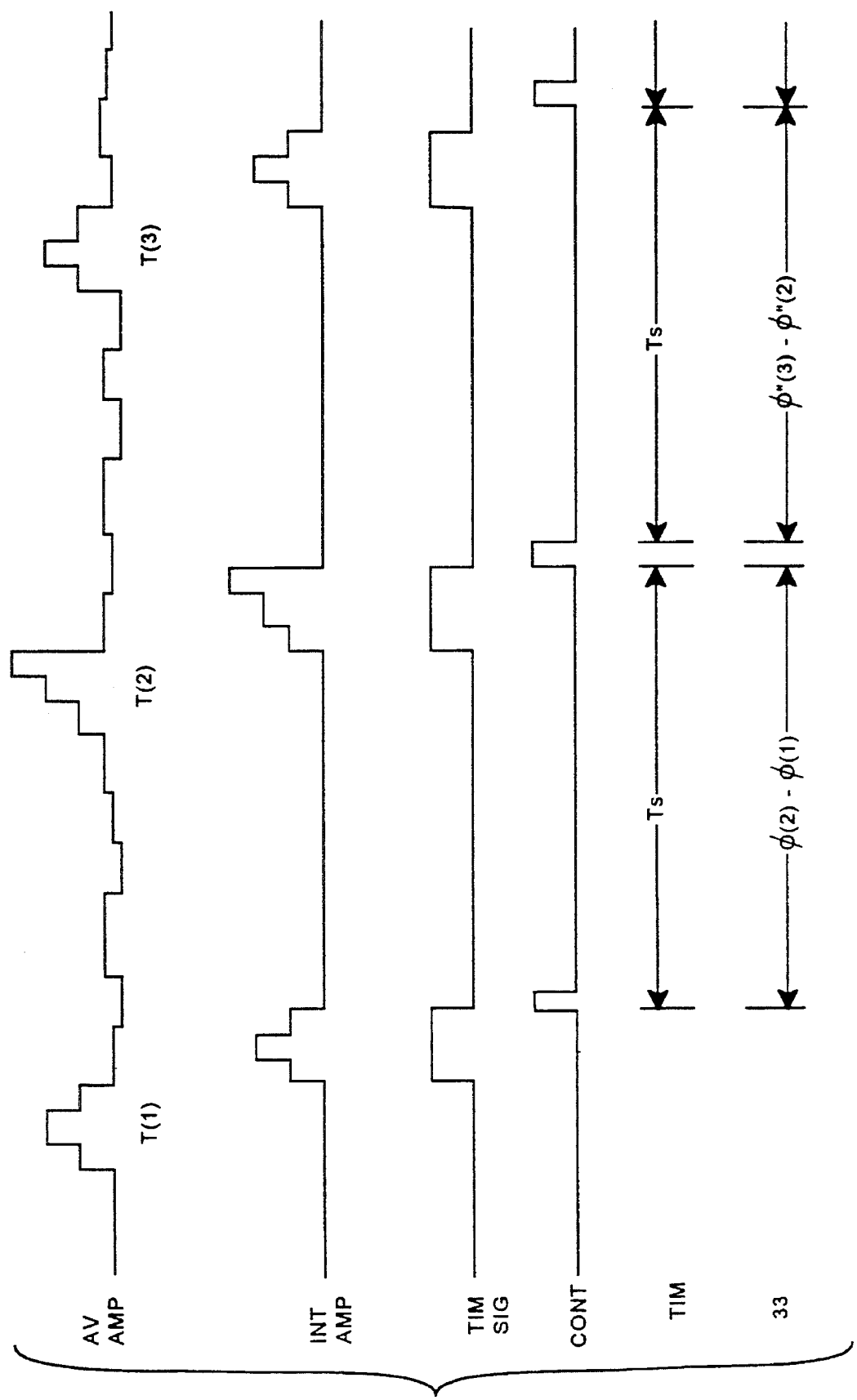
FIG. 5 schematically shows a time chart for use in describing operation of the SS receiver depicted in FIG. 4.

Referring to FIG. 5 and continuously to FIG. 4, the SS demodulator 31 delivers the SS demodulated signal to an amplitude detector 43 besides the data holder 41. Calculating the instantaneous amplitude of each pair of the SS demodulated orthogonal components as the correlation values, the amplitude detector 43 produces an amplitude signal successively representative of such instantaneous amplitudes. Instead of the instantaneous amplitude, the average amplitude is exemplified in FIG. 5 along a top or first row with the legend AvAmp used in FIG. 3.

The amplitude signal is delivered to a leaky amplitude integrator 45 which is more or less similar to the leaky integrator circuit described in the patent to van Driest et al, for use in a modification. The leaky amplitude integrator 45 comprises a cyclic adder 47 supplied with the instantaneous amplitude as an addend. Calculating an amplitude with the instantaneous amplitude and an addend which will be described in the following; the adder 47 produces an amplitude sum signal representative of the amplitude sum.

In the leaky amplitude integrator 45, a shift register 49 has shift register stages equal in number to twice the predetermined number of chips in the transmitter or the receiver SS code and is supplied through a connection (not shown) with a shift signal of the half chip period and from the adder 47 with the amplitude sum as an input correlation value. The input correlation value is shifted through the shift register 49 and is produced as an output correlation value with a delay of one symbol period relative to the input correlation value. The output correlation value is delivered to a leak value generator 51 for generating a leak value for use as the amplitude threshold level by multiplication of the output correlation value and a factor which is less than unity.

From the shift register 49, the output correlation value is delivered furthermore to an integrator circuit subtracter 53 as an integrator circuit minuend. The subtracter 53 is supplied with the leak value as an integrator circuit subtracter. Subtracting the leak value from the output correlation value, the subtracter 53 produces a correlation value difference which is fed back to the adder 47 as the addend. Refreshed at the symbol period, the correlation value difference provides each region of a greater correlation value.

By cyclic addition carried out in this manner in the leaky amplitude integrator 45, the instantaneous amplitude is integrated in each half chip period into integrated amplitudes including the maximum correlation value. The cyclic adder 47 produces the integrated amplitude with a delay of one chip period relative to the average amplitude in the manner illustrated in FIG. 5 along a second row with the legend IntAmp used in FIG. 3 before.

From the cyclic adder 47 of the leaky amplitude integrator 45, the integrated amplitudes are delivered to a timing signal generator 55. In the timing signal generator 55, a latch circuit 57 latches the integrated amplitudes as latched amplitudes. From the latch circuit 57, the latched amplitudes are delivered to a bit shift circuit 59. While bit shifting the latched amplitudes, the bit shift circuit 59 compresses the latched amplitudes by about one fifth in each half chip period to produce reduced or compressed amplitudes.

Connected to the bit shift circuit 59, an on-off switch 61 is closed by the timing signal once in each symbol period. Through the on-off switch 61, the reduced amplitudes are produced as subtrahend amplitudes. The latched amplitudes are delivered furthermore to a threshold subtracter 63. Subtracting the subtrahend amplitudes from the latched amplitudes, the threshold subtracter 63 produces a correlation threshold level.

From the cyclic adder 47, the integrated amplitudes are delivered additionally to a comparator 65 as a first comparison input. Supplied with the correlation threshold level as a second comparison input, the comparator 65 produces a trigger signal when the integrated amplitudes exceed the correlation threshold level. Connected to the comparator 65, a timer 67 defines a region interval lasting the three half-chip periods or throughout the primary through the ternary periods in each symbol period and is triggered by the trigger signal to produce the timing signal with the timing signal made to indicate each of the successive regions during the region interval. More particularly, the timing signal has a high level while the integrated amplitudes are produced as depicted in FIG. 5 along a third row with a legend TimSig.

Supplied with the timing signal, a differential demodulation controller 69 delivers a differential demodulation control signal to the differential demodulator 33. The differential demodulation control signal builds up when the timing signal builds down. Building up to a high level, the differential demodulation control signal keeps the high level during the half chip period. For this purpose, the differential demodulation controller 69 correctly defines the symbol period. In this manner, the differential demodulation control signal measures a control period which lasts during the half chip period immediately following the ternary period of each region interval as illustrated in FIG. 5 along a fourth row with a legend Cont. Such control periods are defined at the symbol period in the manner depicted in FIG. 5 along a fifth or bottom row with a legend TIM.

Controlled by the differential Demodulation control signal, the differential demodulator 33 differential demodulates the SS demodulated signal into the differential demodulated signal by dealing with the difference calculation between a selected one of the primary through the ternary data supplied from the data holder 41 and a next selected one of the primary through the ternary data as exemplified in FIG. 5 along a sixth or bottom row with a legend 33 used as the reference numeral of the differential demodulator.

In the example being illustrated, a first maximum correlation value appears at the secondary period of a first symbol period. A second maximum correlation value is shifted to the ternary period of a second symbol period. A third maximum correlation value occurs at the secondary period of a third symbol period. First and second control periods define the symbol period. Towards a third control period, the second control period also defines the symbol period. First and second calculated differences are consequently equal to ($\phi(2)-\phi(1)$) and ($\phi''(3)-\phi''(2)$) and give rise to no demodulation error.

In this manner, the differential demodulator 33 demodulates the SS demodulated signal into the differential demodulated signal in response to the differential demodulation control signal and consequently to the timing signal at each of the synchronous points and at a time point which is one symbol period later than this each of the synchronous points. On dealing with the difference calculation, the differential demodulator 33 can monitor the maximum correlation values in the primary through the ternary data in the successive regions to select one of the time instants of maximum correlation values that follows a preceding one of the time instants and precedes a succeeding one exactly by one symbol period.

Reviewing FIGS. 4 and 5, a combination of the amplitude detector 43, the leaky amplitude integrator 45, and the timing signal generator 55 serves as a tracking arrangement for tracking successive regions of a greater correlation value in the SS demodulated inphase and quadrature components to determine synchronous points at time instants of the maximum correlation values included in these regions, respectively, and to produce the timing signal successively indicative of the synchronous points. Another combination of the differential demodulator 33, the data holder 41, and the differential demodulation controller 69 serves as a differential demodulator arrangement. Using the timing signal, the differential demodulator arrangement differential demodulates the SS demodulated orthogonal components into the differential demodulated components at each of the synchronous points and at a time instant which is always one symbol period later than the last-mentioned synchronous point.

It is now appreciated in connection with the SS receiver being illustrated that the SS modulated transmission signal is eventually differential demodulated into the receiver output signal with the difference calculation carried out faithfully inversely relative to differential modulation used in producing the SS modulated transmission signal even when it is necessary to control the difference calculation either shorter or longer than one symbol period. This is so done with serious attention directed to the fact that one symbol period is regularly used in differential modulation on producing the SS modulated transmission signal. As a result, this makes it possible to achieve a high demodulation precision.

While this invention has thus far been described in specific conjunction with only one preferred embodiment thereof, it will now be readily possible for one skilled in the art to put this invention in various other manners. For example, it is possible to use in the shift register 49 the predetermined number of shift register stages with the shift signal given the receiver clock period. It is furthermore possible to use as the receiver clock period an integral multiple of the transmitter clock frequency. In this event, an integral submultiple of the chip period should be used in correspondence to the integral multiple instead of the half chip period. At any rate, the integral submultiple should be understood to include division by one.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A spectrum spread receiving method of receiving a spectrum spread modulated signal transmitted from a spectrum spread transmitter for differential modulation of adjacent symbol data of a transmitter input signal into differential modulated components and for individually multiplying a spectrum spread code and said differential modulated components into spectrum spread modulated components of said spectrum spread modulated signal said spectrum spread receiving method includes the steps of receiving said spectrum spread modulated signal as reception components having a common symbol period, individually multiplying said spectrum spread code and said reception components into spectrum spread demodulated components, and output demodulating said spectrum spread demodulated components into differential demodulated components of a reproduction of said transmitter input signal, wherein said output demodulating step comprises the steps of:

tracking successive regions of a greater correlation value in said spectrum spread demodulated components to produce a timing signal indicative of synchronous points in said regions, respectively; and differential demodulating responsive to said timing signal said spectrum spread demodulated components into said differential demodulated components at each of said synchronous points and at a time which is always one symbol period later than each of said synchronous points, said spectrum spread code includes a predetermined number of chips having a common chip period equal to said symbol period divided by said predetermined number, wherein said tracking step comprises the steps of:

leaky integrating an instantaneous amplitude, during an integral submultiple of said chip period, into integrated amplitudes produced in each of said regions and comprising maximum correlation values in said regions, respectively, wherein said instantaneous amplitude is an instantaneous amplitude which said spectrum spread demodulated components have above an amplitude threshold level as said greater correlation value, each maximum correlation value and a succeeding one of said maximum correlation values in a succeeding one of said regions having a value interval variable shorter and longer than said symbol period; and generating responsive to said maximum correlation values said timing signal.

2. A spectrum spread receiving method of receiving a spectrum spread modulated signal transmitted from a spectrum spread transmitter for differential modulation of adjacent symbol data of a transmitter input signal into differential modulated components and for individually multiplying a spectrum spread code and said differential modulated components into spectrum spread modulated components of said spectrum spread modulated signal, said spectrum spread receiving method includes the steps of receiving said spectrum spread modulated signal as reception components having a common symbol period, individually multiplying said spectrum spread code and said reception components into spectrum spread demodulated components, and output demodulating said spectrum spread demodulated components into differential demodulated components of a reproduction of said transmitter input signal, wherein said output demodulating step comprises the steps of:

tracking successive regions of a greater correlation value in said spectrum spread demodulated components to produce a timing signal indicative of synchronous points in said regions, respectively; and differential demodulating responsive to said timing signal said spectrum spread demodulated components into said differential demodulated components at each of said synchronous points and at a time which is always one symbol period later than each of said synchronous points, said spectrum spread code includes a predetermined number of chips having a common chip period equal to said symbol period divided by said predetermined number, said timing signal successively defining primary through ternary periods having an integral submultiple of said chip period in common in each of said regions and including each of said synchronous points in one of said primary through said ternary periods, wherein said output demodulating step comprises the steps of:

holding responsive to said timing signal said spectrum spread demodulated components at said primary through said ternary periods as primary through ternary data;

producing responsive to said timing signal a differential demodulation control signal defining a control period lasting said integral submultiple of said chip period immediately following the ternary period of each of said regions; and differential demodulating said primary through said ternary data at a selected one of said primary through said ternary periods that is selected in each of said regions by said differential demodulation control signal.

3. A spectrum spread receiver for receiving a spectrum spread modulated signal transmitted from a spectrum spread transmitter for differential modulating adjacent symbol-data of a transmitter input signal into differential modulated components and for individually multiplying a spectrum spread code and said differential modulated components into spectrum spread modulated components of said spectrum spread modulated signal, said spectrum spread receiver includes receiver means for receiving said spectrum spread modulated signal as reception components having a common symbol period, spectrum spread demodulating means for individually multiplying said spectrum spread code and said reception components into spectrum spread demodulated components, and output demodulator means for demodulating said spectrum spread demodulated components into differential demodulated components of a reproduction of said transmitter input signal, wherein said output demodulator means comprises:

tracking means for tracking successive regions of a greater correlation value in said spectrum spread demodulated components to produce a timing signal indicative of synchronous points in said regions, respectively; and differential demodulator means responsive to said timing signal for differential demodulating said spectrum spread demodulated components into said differential demodulated components at each of said synchronous points and at a time which is always one symbol period later than each of said synchronous points, said spectrum spread code includes a predetermined number of chips having a common chip period equal to said symbol period divided by said predetermined number, wherein said tracking means comprises:

leaky integrator means for integrating an instantaneous amplitude, during an integral submultiple of said chip period, into integrated amplitudes produced in each of said regions and comprising maximum correlation values in said regions, respectively, wherein said instantaneous amplitude is an instantaneous amplitude which said spectrum spread demodulated components have above an amplitude threshold level as said greater correlation value, each maximum correlation value and a succeeding one of said maximum correlation values in a succeeding one of said regions having a value interval variable shorter and longer than said symbol period; and timing signal generator means responsive to said integrated amplitudes and timing signal.

4. A spectrum spread receiver as claimed in claim 3, wherein said leaky integrator means comprises:

an amplitude detector for detecting an amplitude of said spectrum spread demodulated components as said instantaneous amplitude; and a leaky integrator for integrating during said integral submultiple of the chip period said instantaneous amplitude into said integrated amplitudes with said instantaneous amplitude reduced by a leak value serving as said amplitude threshold level in each of said regions to provide said greater amplitude value.

5. A spectrum spread receiver as claimed in claim 4, wherein said leaky integrator comprises:

an adder for adding said instantaneous amplitude and an addend into an amplitude sum;

a shift register for shifting at said submultiple of the chip period said amplitude sum supplied from said adder as an input correlation value to produce an output correlation value one symbol period later;

a leak value generator responsive to said output correlation value for generating said leak value; and an integrator circuit substracter for subtracting said leak value from said output correlation value to provide said addend for feedback to said adder;

said adder thereby producing said amplitude sum as each of said integrated amplitudes.

6. A spectrum spread receiver as claimed in claim 4, wherein said timing signal generator means comprises:

correlation threshold level generator means responsive to said integrated amplitudes for generating a correlation threshold level;

a comparator for comparing with said correlation threshold level the integrated amplitudes supplied from said leaky integrator means as a comparator input correlation value at said symbol period to produce a trigger signal when said comparator input correlation value exceeds said correlation threshold level; and a timer defining a region interval in each symbol period and triggered by said trigger signal to produce said timing signal with said timing signal made to indicate each of said regions during said region interval.

7. A spectrum spread receiver as claimed in claim 6, wherein said correlation threshold level generator means comprises:

a latch circuit for latching said integrated amplitudes as latched amplitudes;

a bit shift circuit for bit shifting said latched amplitudes to produce bit shifted amplitudes as reduced amplitudes;

an on-off switch responsive to said timing signal for producing said reduced amplitudes as subtrahend amplitudes during said region interval; and a threshold subtracter for substracting said subtahend amplitudes from said latched amplitudes to produce said correlation threshold level.

8. A spectrum spread receiver as claimed in claim 4, said timing signal successively indicating primary through ternary periods having said integral submultiple of the chip period in common in each of said regions, wherein said output demodulator means comprises:

data holding means responsive to said timing signal for holding said spectrum spread demodulated components at said primary through said ternary periods as primary through ternary data;

differential demodulation control means responsive to said timing signal for producing a differential demodulation control signal defining a control period lasting said integral submultiple of the chip period immediately following said ternary period; and differential demodulator means for differential demodulating said primary through said ternary data at a selected one of said primary through said ternary periods that is selected in each of said regions by said differential demodulation control signal.

9. A spectrum spread receiver as claimed in claim 3, wherein said timing signal generator comprises:

a correlation threshold level generator means responsive to said integrated amplitudes for generating a correlation threshold level;

a comparator for comparing with said correlation threshold level the integrated amplitudes supplied from said leaky integrator means as an input correlation value at said symbol period to produce a trigger signal when said input correlation value exceeds said correlation threshold level; and a timer defining a region interval in each symbol period and triggered by said trigger signal to produce said timing signal with said timing signal made to indicate each of said regions during said region interval.

10. A spectrum spread receiver as claimed in claim 9, wherein said correlation threshold level generator means comprises:

a latch circuit for latching said integrated amplitudes as latched amplitudes;

a bit shift circuit for bit shifting said latched amplitudes to produce bit shifted amplitudes as reduced amplitudes;

an on-off switch responsive to said timing signal for producing said reduced amplitudes as subtrahend amplitudes during said region interval; and a threshold subtracter for subtracting said subtrahend amplitudes from said latched amplitudes to produce said correlation threshold level.

11. A spectrum spread receiver as claimed in claim 9, wherein said leaky integrator means comprises:

an amplitude detector for detecting an amplitude of said spectrum spread demodulated components as said instantaneous amplitude; and a leaky integrator for integrating during said integral submultiple of the chip period said instantaneous amplitude into said integrated amplitudes with said instantaneous amplitude reduced by a leak value serving as said amplitude threshold level in each of said regions to provide said greater correlation value.

12. A spectrum spread receiver as claimed in claim 11, wherein said leaky integrator comprises:

an adder for adding said instantaneous amplitude and an addend into an amplitude sum;

a shift register for shifting at said submultiple of the chip period said amplitude sum supplied from said adder as a shift register input correlation value to produce an output correlation value one symbol period later;

a leak value generator responsive to said output correlation value for generating said leak value; and an integrator circuit subtracter for subtracting said leak value from said output correlation value to provide said addend for feedback to said adder;

said adder thereby producing said amplitude sum as each of said integrated amplitudes.

13. A spectrum spread receiver as claimed in claim 9, said timing signal successively indicating primary through ternary periods having said integral submultiple of the chip period in common in each of said regions, wherein said output demodulating means comprises:

data holding means responsive to said timing signal for holding said spectrum spread demodulated components at said primary through said ternary periods as primary through ternary data;

differential demodulation control means responsive to said timing signal for producing a differential demodulation control signal defining a control period lasting said integral submultiple of the chip period immediately following said ternary period; and differential demodulator means for differential demodulating said primary through said ternary data at a selected one of said primary through said ternary periods that is selected in each of said regions by said differential demodulation control signal.

14. A spectrum spread receiver for receiving a spectrum spread modulated for receiving a spectrum spread modulated signal transmitted from a spectrum spread transmitter for differential modulating adjacent symbol-data of a transmitter input signal into differential modulated components and for individually multiplying a spectrum spread code and said differential modulated components into spectrum spread modulated components of said spectrum spread modulated signal, said spectrum spread receiver includes receiver means for receiving said spectrum spread modulated signal as reception components having a common symbol period, spectrum spread demodulating means for individually multiplying said spectrum spread code and said reception components into spectrum spread demodulated components, and output demodulator means for demodulating said spectrum spread demodulated components into differential demodulated components of a reproduction of said transmitter input signal, wherein said output demodulator means comprises:

tracking means for tracking successive regions of a greater correlation value in said spectrum spread demodulated components to produce a timing signal indicative of synchronous points in said regions, respectively; and differential demodulator means responsive to said timing signal for differential demodulating said spectrum spread demodulated components into said differential demodulated components at each of said synchronous points and at a time which is always one symbol period later than each of said synchronous points said spectrum spread code includes a predetermined number of chips having a common chip period equal to said symbol period divided by said predetermined number, said timing signal successively indicating primary through ternary periods having an integral submultiple of said chip period in common in each of said regions, wherein said output demodulator means comprises:

data holding means responsive to said timing signal for holding said spectrum spread demodulated components at said primary through said ternary periods as primary through ternary data;

differential demodulation control means responsive to said timing signal for producing a differential demodulation control signal defining a control period lasting said integral submultiple of the chip period immediately following said ternary period; and differential demodulator means for differential demodulating said primary through said ternary data at a selected one of said primary through said ternary periods that is selected in each of said regions by said differential demodulation control signal.

* * * * *